E. L. POOR.
MEANS FOR HOLDING FILM COVERING STRIPS TO CAMERA SPOOLS.
APPLICATION FILED AUG. 25, 1919.
1,330,494. Patented Feb. 10, 1920.
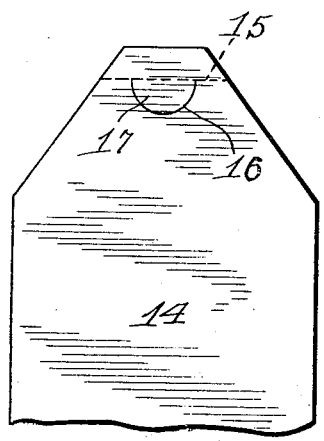
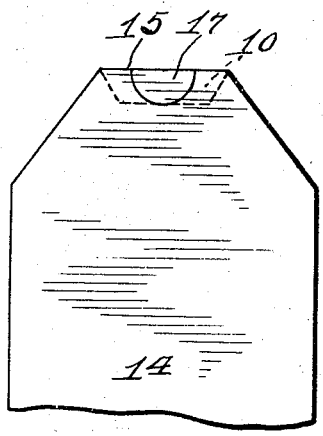
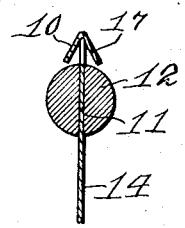
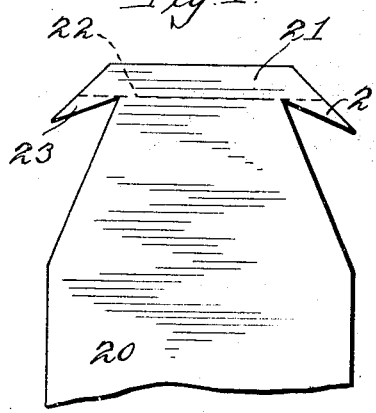
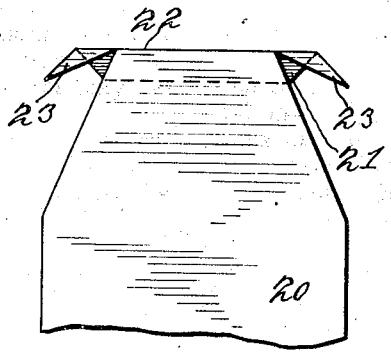
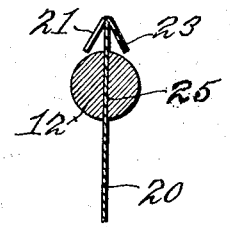
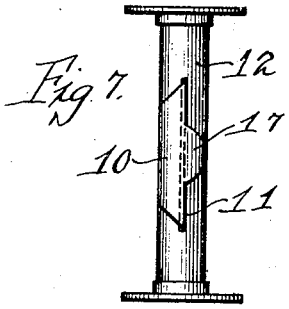
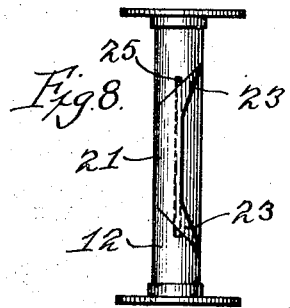
Witness:
Dav E. S. Magnusson.
Inventor:
Edwin L. Poor
By Luther Johns
Atty.

UNITED STATES PATENT OFFICE.

EDWIN L. POOR, OF OAK PARK, ILLINOIS, ASSIGNOR OF ONE-HALF TO LUTHER JOHNS, OF OAK PARK, ILLINOIS.

MEANS FOR HOLDING FILM-COVERING STRIPS TO CAMERA-SPOOLS.

1,330,494.   Specification of Letters Patent.   Patented Feb. 10, 1920.

Application filed August 25, 1919. Serial No. 319,681.

*To all whom it may concern:*

Be it known that I, EDWIN L. POOR, a citizen of the United States, residing in Oak Park, Cook county, Illinois, have invented certain new and useful Improvements in Means for Holding Film-Covering Strips to Camera-Spools, of which the following is a specification.

My invention relates to means for holding upon a camera spool the strip with which the film is wound. Its object is to provide means which will effectively hold the strip upon the empty spool when loading the camera with a new film, and thus to avoid the annoyance and sometimes loss due to the failure of the strip to become caught in the spool slot at such time.

In the accompanying drawings, which form a part of this specification, I have illustrated these improvements in a preferred and modified form. Figure 1 is a face view of the end of the strip cut in the preferred form; Fig. 2 is a similar view with the end of the strip bent over ready for application to the spool slot; Fig. 3 is a medial longitudinal section through the strip and a transverse section through the spool showing the catch or holding elements extending laterally ready to be engaged holdingly by the spool when the spool is rotated in the winding operation; Figs. 4, 5 and 6 are similar views respectively showing the modified form of the device; and Figs. 7 and 8 are views of spools showing respectively the preferred and modified forms of these holding means in operative position.

The present improvements are for use with camera spools having a slot through the same for receiving the end of the strip with which the film is wound. Such spools are old and well known, and it is also old practice to cut the end of the strip on tapering side lines substantially as shown in Fig. 1 and to bend over the end thereof forming a fold 10, as shown in Figs. 2 and 3. I do not know whether such fold 10 has been intended heretofore as a catch for the strip 14 after passing through the slot 11 of the spool 12, or whether the end is folded over merely to provide a more easy entrance by the strip into the slot; but such fold 10 is ineffective in itself to hold the strip against its coming out of the slot when the winding operation begins, for without additional means the pull upon the strip simply bends this fold back more into alinement with the rest of the strip at such time and the strip readily comes out of the slot.

I overcome the objections mentioned, in the preferred way, by cutting through the strip, beginning at the folding line 15, on a substantially circular line 16, as shown in Figs. 1 and 2, or on other lines if desired, for instance V-shaped, forming a tab or ear 17 which is free from the strip except on the line 15 between the ends of the cut 16 terminating in the line 15. This tab or ear 17 will naturally flare outwardly as shown in Fig. 3 if the cutting or stamping operation forming the tab be performed from the reverse side, or it may be bent outward slightly by the user just before application to the spool.

After the end of the strip 14 thus formed is passed through the slot 11 in the spool the fold 10 and the tab or ear 17 flare apart, as shown in Fig. 3, and when the winding operation is begun an effective lock is thus had for the strip, for each of these holding elements 10 and 17 coacts with the other to prevent the other from straightening out under the pull. This action is obtained from the fact that the tendency of one of them to straighten out throws the strip to the opposite side of the slot (the slot being wide enough to admit of the quite free entrance of the strip) and thus causes the opposite holding element to become caught with the sharp edges of the spool at the slot there in the acute angle between such opposite holding element and the body of the strip. The result is that a very secure hold is had by the strip upon the spool, and the proper winding of the strip is assured.

In the device of Figs. 4, 5, 6 and 8 I cut the end of the strip 20 substantially as shown in Fig. 4 and then bend over the fold 21 along line 22, thus forming two laterally and rearwardly projecting ears 23 on one side of the strip, with the fold 21 on its opposite side. The holding action is substantially the same as that already described for the device of Fig. 2. It is pointed out, however, that with the device of Fig. 5 the tabs or ears 23 may extend laterally beyond the slot 25, as shown in Fig. 8, since these ears are so flexible that during the insertion of the strip into and through the slot 25 they bend toward each other in order to get through, and after passing through they spring apart again and thus insure their spreading into the position shown in Fig. 8 when the winding begins.

The present improvements thus overcome a serious objection, for aside from the annoyance due to repeated attempts to make the strip hold according to the practice heretofore, it frequently happens that during these various efforts the strip becomes sufficiently unwound to expose a portion of the film.

The invention includes various modifications and reference should be had to the appended claims to determine what I consider as being included in the improvements herein set forth. In these claims the term "oppositely disposed" has reference to the opposite faces or sides of the strip.

I claim:

1. The combination with a strip adapted to be wound upon a spool, of flexible oppositely disposed tongue-like holding elements adapted to flare apart after passing through a longitudinal slot in a spool for engaging the spool on opposite sides of the slot.

2. The combination with a strip carrying a photographic film adapted to be wound upon a spool, of an integral fold bent over at the end of the strip on one side thereof and adapted to flare outwardly, and a tab or ear adapted to flare outwardly from the other side thereof, said tab or ear extending in a direction away from the line of said fold, said fold and said tab being adapted to engage the spool on opposite sides of a strip-receiving slot therein.

EDWIN L. POOR.